(12) United States Patent  
Dagaeff et al.

(10) Patent No.: US 8,578,505 B2  
(45) Date of Patent: Nov. 5, 2013

(54) METHOD FOR CONTROLLING THE USE OF A CONDITIONAL ACCESS CONTENT AND MULTIMEDIA UNIT FOR IMPLEMENTING SAID METHOD

(75) Inventors: Thierry Dagaeff, L'Isle (CH); Philippe Desarzens, Bussigny (CH)

(73) Assignee: NAGRAVISION S.A., Cheseaux-sur-Lausanne ( * ) Notice: Subject to any disclaimer, the term of this patent is extended or adjusted under 35 U.S.C. 154(b) by 340 days.

(21) Appl. No.: 12/999,904

(22) PCT Filed: Jun. 19, 2009

(86) PCT No.: PCT/IB2009/052633  
§ 371 (c)(1),  
(2), (4) Date: Dec. 17, 2010

(87) PCT Pub. No.: WO2009/153759  
PCT Pub. Date: Dec. 23, 2009

(65) Prior Publication Data  
US 2011/0113492 A1    May 12, 2011

Related U.S. Application Data

(60) Provisional application No. 61/129,351, filed on Jun. 20, 2008.

(51) Int. Cl.  
*H04L 29/06* (2006.01)

(52) U.S. Cl.  
USPC .............................. 726/27; 380/210

(58) Field of Classification Search  
USPC .................. 726/27, 28; 380/210, 200, 201  
See application file for complete search history.

(56) References Cited

U.S. PATENT DOCUMENTS 6,976,009 B2 *  12/2005  Tadayon et al. .................. 705/51  
7,299,362 B2 *  11/2007  Shen et al. ..................... 713/189

(Continued)

FOREIGN PATENT DOCUMENTS

FR    2 848 764    6/2004

OTHER PUBLICATIONS

DVB, IP Datacast over DVB-H: Service purchase and protection, Dec. 2005, DVB.*

(Continued)

*Primary Examiner* — David Garcia Cervetti  
(74) *Attorney, Agent, or Firm* — DLA Piper LLP US

(57) ABSTRACT

The present invention concerns a method for controlling the use of a conditional access content (C0), said content being sent to a plurality of multimedia units (STB) connected to a management center (CG). The method comprises the steps of defining controlled content usage types; defining a set of usage rules (UR) for at least two controlled content usage types by setting condition values for these controlled content usage types; defining at least two content profiles (CP) by associating one usage rule of said at least two controlled content usage types; sending management messages containing the content profiles (CP) to at least a set of multimedia units (STB) linked to said management center; storing the content profiles (CP) in the concerned multimedia units; sending the conditional access content (C0), and joined sending of a control message (ECM) containing at least a means for determining the content profile (CP) that is to be linked to the content (C0); further to the reception by a multimedia unit of the encrypted content (C0) and of the corresponding control message (ECM), extracting the means for determining the content profile that is to be linked to the content; searching in the multimedia unit, the content profile corresponding to the means for determining the content profile that is to be linked to the content; and of using the content (C0) by the multimedia unit according to the usage rules contained in the content profile that is to be linked to the content. The invention further concerns a multimedia unit for implementing said method.

22 Claims, 3 Drawing Sheets

(56) References Cited

U.S. PATENT DOCUMENTS

| | | | |
|---|---|---|---|
| 7,584,495 B2* | 9/2009 | Hannuksela et al. | 725/101 |
| 7,739,413 B2* | 6/2010 | Dewa et al. | 709/250 |
| 7,904,392 B2* | 3/2011 | Namba | 705/58 |
| 8,095,124 B2* | 1/2012 | Balia | 455/418 |
| 8,266,060 B2* | 9/2012 | Namba | 705/52 |
| 8,266,282 B2* | 9/2012 | Kocho et al. | 709/224 |
| 2003/0083954 A1* | 5/2003 | Namba | 705/26 |
| 2004/0054923 A1* | 3/2004 | Seago et al. | 713/201 |
| 2004/0243808 A1* | 12/2004 | Ishiguro et al. | 713/176 |
| 2005/0022227 A1* | 1/2005 | Shen et al. | 725/28 |
| 2007/0078928 A1* | 4/2007 | Yang et al. | 709/203 |
| 2007/0165854 A1* | 7/2007 | Higashi et al. | 380/212 |
| 2008/0040761 A1* | 2/2008 | Xu et al. | 725/105 |
| 2008/0098062 A1* | 4/2008 | Balia | 709/203 |
| 2008/0127291 A1* | 5/2008 | Xu et al. | 725/118 |
| 2009/0006624 A1* | 1/2009 | Alkove et al. | 709/226 |
| 2009/0011740 A1* | 1/2009 | Aggarwal et al. | 455/412.1 |
| 2009/0125377 A1* | 5/2009 | Somji et al. | 705/10 |
| 2009/0131152 A1* | 5/2009 | Busse | 463/23 |
| 2009/0133090 A1* | 5/2009 | Busse | 725/132 |

OTHER PUBLICATIONS

International Search Report issued in International Application No. PCT/IB2009/052633, Mailed Oct. 2, 2009.

Written Opinion issued in International Application No. PCT/IB2009/052633, Mailed Oct. 2, 2009.

English language abstract of FR 2 848 764, published Jun. 18, 2004.

Digital Video Broadcasting: "IP Datacast Over DVB-H: Service Purchase and Protection (SPP)", DVB Document A100; Dec. 2005; http://www.dvb-h.org/pdf/a100.tm3455r3.cbms1476.IPDC_DPP.pdf; XP002406708.

Digita et al., "IPDC Services Purchase and Protection: Joint Response to the DVB CfT"; DVB Document, Version 1, Sep. 16, 2004; XP007902807.

EBU Project Group B/CA, "Functional Model of a Conditional Access System"; EBU Review Technical, No. 266, Grand-Saconnex, CH, Winter 1995, pp. 64-77; XP000559450.

* cited by examiner

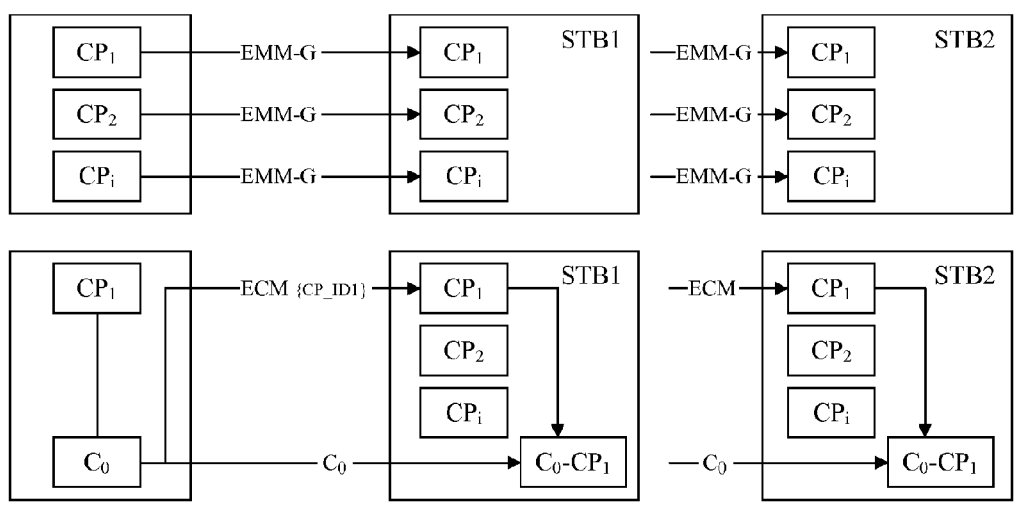

_US 8,578,505 B2_

METHOD FOR CONTROLLING THE USE OF A CONDITIONAL ACCESS CONTENT AND MULTIMEDIA UNIT FOR IMPLEMENTING SAID METHOD

TECHNICAL FIELD

The present invention is generally related to the field of content protection technology and more specifically proposes a method for controlling the use of conditional access content, said content being sent to a plurality of multimedia units connected to a management center. It also concerns a multimedia unit for implementing said method.

The method and the multimedia unit can in particular be used in the field of the pay-TV wherein the access to content is controlled by access conditions and wherein the general use of the content is controlled by usage rules.

The invention is of particular interest when used with the Digital Video Broadcast (DVB) standard named Content Protection and Copy Management (CPCM). However, it should be understood that the invention is not limited to DVB or CPCM. Firstly, CPCM applies to management of content in an authorized domain (an extension of the home network including mobile and remote devices). CPCM may be used as a DRM interoperability platform, ensuring that CPCM-compliant devices may transfer events between each others and from/to devices implementing a trusted third-party DRM.

BACKGROUND ART

Content protection technology is about content and usage rules encryption, usage rules binding to content and usage rules enforcement. Usage rules govern permissions and restrictions applying to events or content handling, such as consuming, copying, and moving.

By "content", it is meant hereafter any digital media object subject to usage rules and which has a commercial value.

Content protection technology (CPT) applies to management of content in an authorized domain (an extension of the home network including mobile and remote devices). Content is encrypted and cryptographically bound to a Content License (CL) embedding usage rules.

Such features as rental periods, simultaneous viewing control and remote access permission make possible advanced business models as well as flexible content handling by users.

One may use CPT to consolidate the existing CAS business model. A typical example is provided by the broadcast of a high commercial value movie. The CAS has a mean to sell a product giving access to the corresponding content on a per-event basis, called Pay-Per-View (PPV) or Video-on-Demand (VOD). Knowing this event will be acquired as content under content protection technology in the user domain, we will use usage rule to forbid copy of the movie, but grant remote access (so the user can order the event in advance and consume it at any place when it is broadcast). This is a natural reinforcement of the initial concept of PPV or VOD to the user domain.

A complementary example is provided by the broadcast of sport-event channel. The CAS has a way to sell a product giving access to the channel, called subscription. A natural reinforcement of the initial concept is to forbid remote access during broadcast, but allow copying (since the value of sport event lies in the fact it is a live event), and allow remotely accessing the record once the event is past.

The technical means to propagate these extended concepts of PPV, VOD or subscription events in the user domain is to securely signal usage rules with the CAS Entitlement Control Messages (ECM), and implementing ECM-to-content license translation.

This solution has several drawbacks. One of them comes from the fact that the usage rules can be quite big. Thus, introducing a usage rule in an ECM requires changing the size of the ECM. This implies that receivers must be updated for being able to process these ECMs. This also implies that bandwidth is used to send ECM rather than valuable content. All these characteristics imply that complex rules cannot be used in such a system.

Another drawback of this solution is that one has to signal several usage rules if several content protection technologies must be targeted in the home network. This also limits the complexity of the rules and the number of usage rules that can be implemented.

The specification of addressed content protection technology may evolve. In case one uses a third party technology (e.g. standard technology), this evolution is not controlled by the management center. The evolution may imply modifications in the entitlement control message format. The modifications should be made independently from the management center.

DISCLOSURE OF INVENTION

In order to overcome these drawbacks, the present invention proposes a method for controlling the use of a conditional access content, said content being sent to a plurality of multimedia units connected to a management center, said method comprising the following steps:

- defining controlled content usage types;
- defining a set of usage rules for at least two controlled content usage types by setting condition values for these controlled content usage types;
- defining at least two content profiles by associating one usage rule of said at least two controlled content usage types;
- sending management messages containing the content profiles to at least a set of multimedia units linked to said management center;
- storing the content profiles in the concerned multimedia units;
- sending the conditional access content, and joined sending of a control message containing at least a means for determining the content profile that is to be linked to the content;
- further to the reception by a multimedia unit of the encrypted content and of the corresponding control message, extracting the means for determining the content profile that is to be linked to the content;
- searching in the multimedia unit, the content profile corresponding to the means for determining the content profile that is to be linked to the content;
- using the content by the multimedia unit according to the usage rules contained in the content profile that is to be linked to the content.

The object of the invention is also achieved by a method for controlling the use of a conditional access content, said content being sent to a plurality of multimedia units connected to a management center, said method comprising the following steps:

- defining controlled content usage types;
- defining a set of usage rules for at least two controlled content usage types by setting condition values for these controlled content usage types;

defining at least two content profiles by associating one usage rule of said at least two controlled content usage types;

defining at least two content profiles families, each family comprising at least one content profile and each content profile family further comprising a unique identifier;

associating in the management center, each multimedia unit with a user profile;

associating each user profile with one content profile of each content profile family;

sending said content profile of each family to the concerned multimedia units;

storing the content profiles of each content profile family in the concerned multimedia units;

sending the conditional access content, and joined sending of a control message containing at least a means for determining the content profile family that is to be used;

further to the reception by a multimedia unit of the encrypted content and of the corresponding control message, extracting the means for determining the content profile family that is to be linked to the content;

searching in the multimedia unit, the content profile family corresponding to the means for determining the content profile family that is to be linked to the content;

searching in the multimedia unit the content profile to be linked to the content among the content profiles of the determined content profile family;

using the content by the multimedia unit according to the usage rules contained in the content profile that is to be linked to the content.

The object of the invention is also achieved by a multimedia unit comprising means for implementing the method of this invention.

In order to spare ECM bandwidth, the CAS may use predefined Usage Rules (UR), i.e. discrete states of usage types, obtained by defining the possible values of the parameter set specifying the controlled usage type, for instance three rules defining rental periods of 1 day, 3 days and 1 week respectively, rules fixing the simultaneous viewing count to some values, or a rule defining the date after which remote access is permitted. In simultaneous view count, the user is enabled to view simultaneously the content on a predefined number of screens within its user domain.

The concept can be extended to the case where different ways to consume the content are sold with different prices to different users. Here, the CAS can define User Profiles (UP) that can be bought by users. It then signals with the event the applying pairs {UR identifier, UP identifier}. The receiver applies the usage rules of the pair where the user profile identifier matches its own user profile. The use of user profile allows increasing profitability by selling the most comfortable/not-limiting usage rules.

BRIEF DESCRIPTION OF DRAWINGS

The present invention and its advantages will be better understood with reference to the enclosed drawings and to a detailed description of several embodiments, wherein:

FIG. 1 shows an example of usage rules as used in the method of the present invention;

FIG. 2 represents content profiles as used in the present invention;

FIG. 3 shows a first embodiment of the method of the invention;

MODES FOR CARRYING OUT THE INVENTION

Figure 4:
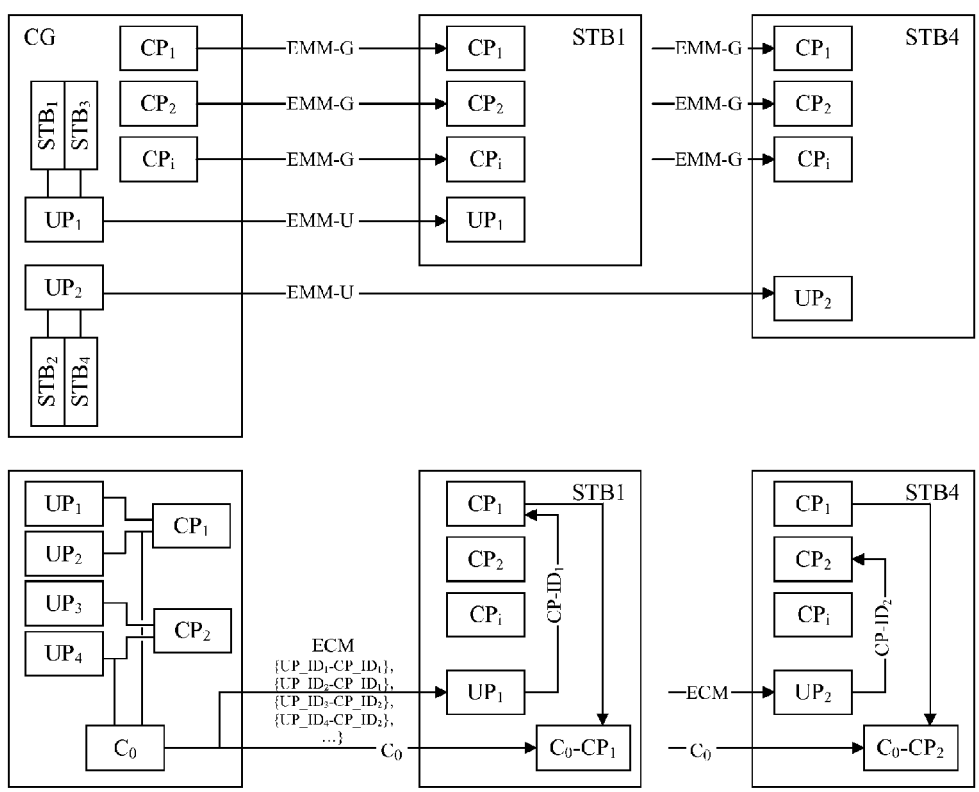
FIG. 4 represents a second embodiment of the method of the invention.
Figure 5:
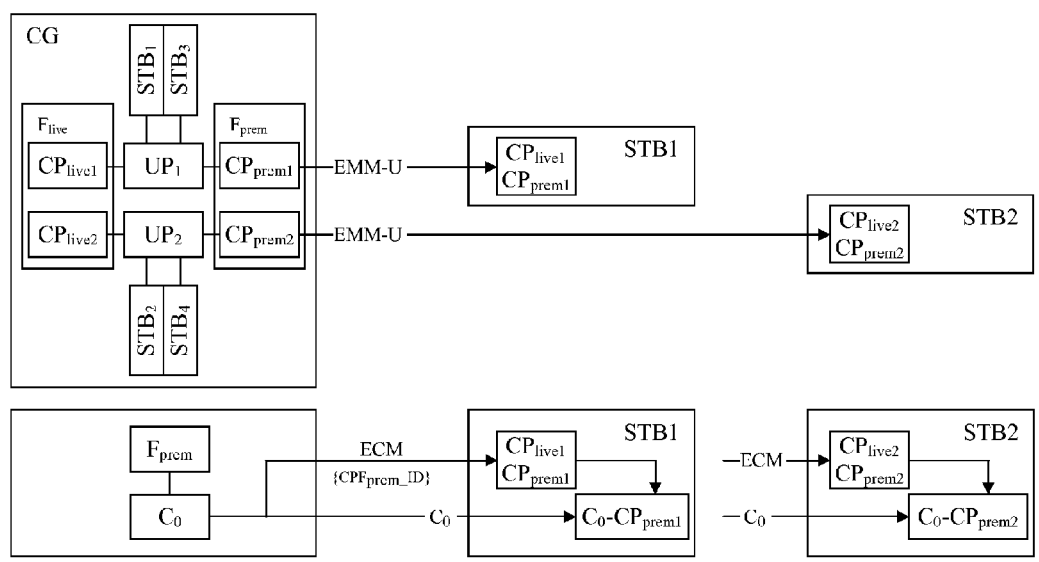
FIG. 5 illustrates a third embodiment of the invention.

According to the invention, there is provided a method for controlling the use of a digital content or event. Hereafter, an event refers to a set of digital data forming a movie, a sport event or a piece of music for example. Events are sent by a provider which is associated to a management center CG. These events are broadcast to a plurality of multimedia unit STB. Prior to being broadcast, an event is split into blocks that are encrypted by a key called control word. Such a control word is usually used to decrypt content corresponding to 2 to 10 seconds of the event in clear. Of course, other values are also possible, for example one control word for the whole event. The part of a block corresponding to an event is called a content hereafter.

Once an event is received by a multimedia unit, a content protection technology is in charge of managing the content and in particular to control the content usage that is allowed to the user. The management center signals this controlled content usage together with the event through a number of parameters. These parameters can be interpreted according to the concerned content protection technology implemented by the multimedia unit. These parameters can be grouped in controlled usage types, each type concerning a specific aspect of content management. Example of usage types are "rental period (RP)", "copy (CY)", "remote access date (RAD)", "output control (OC)", . . . .

According to the method of the invention, one or more usage rules are defined. A usage rule is an instantiation of a given controlled usage type, i.e. a setting of the parameters values that specify what can be done with an event or a content when it is received or stored on a multimedia unit regarding this particular controlled usage type. As an example, a usage rule can define that the copy of the event is forbidden. Another usage rule can define that the remote access to the event is authorized.

FIG. 1 shows examples of possible usage rules. The first usage rule $UR_{11}$ specifies a condition value for a rental period. Here, the rental period is one day. The rental period is 3 days for the usage rule $UR_{12}$ and 7 days for the usage rule $UR_{13}$. The usage rules $UR_{21}$, $UR_{22}$ and $UR_{23}$ concern the authorized numbers of copies. The condition values for $UR_{21}$ corresponds to "copy forbidden", to "one copy allowed" for $UR_{22}$ and to "unlimited number if copies" for $UR_{23}$.

A usage rule needs the specification of the format of parameters that control the usage type. For example, a usage rule may express the fact that the remote access is authorized after a specific date; in this case, the parameter would be a date. The "copy" category could be based on 2 bit values meaning "authorized once", "unlimited authorization" or "forbidden". The rental period usage type can be parameterized either by using two dates (the start and end of a rental window) or by using one value representing the duration of the rental period.

The table below shows an example of twelve possible usage rules for the four controlled usage types mentioned above.

| | | |
|---|---|---|
| $RP_1$ = 1 day | $RP_2$ = 3 days | $RP_3$ = 1 week |
| $CY_1$ = 0 | $CY_2$ = 1 | $CY_3$ = unlimited |
| $RAD_1$ = never | $RAD_2$ = in 1 day | $RAD_3$ = immediately |
| $OC_1$ = strong | $OC_2$ = medium | $OC_3$ = No |

It should be noted that an event is formed by several content blocks. A usage rule according to the invention applies to a specific content. However, usually the usage rules for each content of a specific event are the same, so that it corresponds to the usage rule of the event. It is possible to apply a different usage rule for a part of the event, for example a less restrictive rule for the first few minutes of the event.

Since the numerous multimedia units addressed by one service provider may implement several different content protection technologies, the set of controlled usage types spanning all content protection technologies need may be broader than the set needed for one technology only, since the technologies may have different capacities and control granularity. On the other hand, a given usage type will most of the time concern several technologies. For instance, it is very likely that a content protection technology is able to control the number of copies that can be done of a content. In this case, the usage rules signaled by the management center in order to control content copy could be actually interpreted by all content protection technologies that manage content copy. The internal implementation of the multimedia unit is in charge to map the signaled usage rules to parameters and formats that are compliant with the addressed content protection technology. There are two possible system implementations here. The management center may signal only one usage rule, in one format, for one usage type; this can be done if each multimedia unit is able to map this unique format to the particular format required by the implemented content protection technology. In a second case, the management center may have to signal different usage rules for the same usage type with a format adapted to the various content protection technologies so that the receiving multimedia units are able to interpret them. For instance, there could be two usage rules signaled with a same event for controlling of content copy: one rule could use 2 bits with the value 01 to tell the content can be copied once, while the other rule could use one bit for the same purpose.

A content profile CP as used in the method of the invention is a set of usage rules UR for the different existing usage types. It is a "complete set" of usage rules, i.e. a set of usage rules that cover each defined type for all content protection technologies that must be addressed by the management center, i.e. for all technologies implemented by the whole set of multimedia units that receive events from the management center. The examples below show possible content profiles based on the above mentioned usage rules and usage types.

There can be two content profiles for 'premium content' of which consumption must be severely limited:

$CP_{prem1}$: RP=NA, CY=0, RAD=never, OC=strong, ID=11
$CP_{prem2}$: RP=1 day, CY=1, RAD=never, OC=strong, ID=12

There can be three content profiles for generic 'rental content':

$CP_{rent1}$: RP=1 day, CY=1, RAD=never, OC=medium, ID=21
$CP_{rent2}$: RP=1 day, CY=1, RAD=immediate, OC=medium, ID=22
$CP_{rent3}$: RP=1 week, CY=1, RAD=immediate, OC=medium, ID=23

There can be three content profiles for live events allowing distinction between events that have a greater value when they are live:

$CP_{live1}$: RP=unlim., CY=1, RAD=never, OC=No, ID=31
$CP_{live2}$: RP=unlim., CY=1, RAD=1 day later, OC=No, ID=32
$CP_{live3}$: RP=unlim., CY=unlim., RAD='at the end', OC=No, ID=33

Notice that if different content protection technologies require different usage rules, a content profile could be of the following form:

$CP_{liveX}$: RP=unlim., CY_techno1=1, CY_techno2=01, ....

Each content profile also contains a unique identifier ID whose function is explained below. The content profiles are also represented in FIG. 2. A content profile could also contain fewer values than the number of controlled usage types. This means that at least one type is not defined in the user profile. The way to deal with this type of "partial" content profile is also explained below.

First Embodiment

According to a first embodiment of the invention, as shown on FIG. 3, at least two different content profiles ($CP_1$, $CP_2$, ..., $CP_i$), are defined, containing different usage rules UR for the different usage types (e.g. with four usage types: $CP_1=\{RP_1, CY_1, RAD_1; OC_1\}$, $CP_2=\{RP_2, CY_2, RAD_2; OC_2\}$).

These content profiles are sent to the multimedia unit STB for further use, as explained below. In order to send the content profiles ($CP_1$, $CP_2$, ..., $CP_i$) from the management center (CG) to the multimedia units ($STB_1$, $STB_2$), each content profile is introduced into one or several management messages. These messages can be conventional entitlement messages EMM or they may have a specific format. It should be noted that several content profiles are generally not sent in a same message.

Even so, if the size of one content profile is too large to be sent in one management message, it can be sent in several chained messages. In particular, the system may rely on the cutting in several usage types. In order to send large content profiles, the system may rather send separately the usage rules ($UR_{11}, UR_{12}, UR_{13}, UR_{21}, UR_{22}, UR_{23}, ...$) that compose the content profiles. In this case, the usage rules may be associated to content profile identifiers and the receiver may use the content profile identifier to gather all usage rules that participate to a given content profile and rebuild the whole content profile. This composition of the content profile may be performed when the separate usage rules are received. In a variant of the invention, the composition may be performed later, when the identifier of the content profile applying to a specific event is signaled.

These management messages are usually encrypted to prevent a fraudulent user from altering a usage rule.

Once a content profile CP or separate usage rules UR are received by a multimedia unit STB, they are stored in a memory of this unit. In this first embodiment, the management messages are global, so that all content profiles are sent to all the multimedia units connected or managed by the management center. This means that all the multimedia units receive and store the same content profiles or usage rules.

As it can be understood, sending the content profiles or separate usage rules in management messages can be made out-of-band, i.e. this does not use broadband that should be available for sending audio/video events to users for example.

As it is well known, the control word for a content is sent in an entitlement control message ECM, together with access conditions defining which conditions must be fulfilled to enable access to the content.

According to the method of the invention, a control message is sent to the multimedia units STB, said control message ECM containing at least a control word and a content profile identifier ($CP\_ID_1$). This identifier can be a short value, for example one byte long, so that it can be introduced in a control message without requiring a change of the format. This content profile identifier enables to retrieve one content profile among all the content profiles stored in a memory of the multimedia unit. This content profile is CP1 in the example of FIG. 3.

In a variant of the invention, the building of the content profile may be performed just at the instant of the receiving of the content profile identifier by bringing together the separately stored usage rules that are associated with the said content profile identifier.

In another variant of the invention, the control message may carry a list of usage rule identifiers ($UR\_ID_{11}$, $UR\_ID_{21}$, $UR\_ID_{32}$), one for each usage type. In this case, the size of the control message is larger, but the flexibility in content profile differentiation is better, since the management center does not need to predefine the particular combination of usage rules that make content profiles.

Once the correct content profile CP is identified, the content is associated with it. This means that when the content is used by the multimedia unit, this use is controlled in such a way that it corresponds to all usage rules associated to the content profile identifier bound to this content. The use of a content encompasses here, but is not limited to, the access in order to view the content, the storage on a memory, the remote access to the content or sending the content to another device.

It should be noted that this control method does not replace the conventional verifications of access conditions and access rights that are usually used with conditional access data. This method rather controls how the content can be used.

As can be understood from above, the advantages of this first embodiment of the method of the invention are as follows:
a) Usually, the control messages ECM have a proprietary internal format. This format generally allows for the addition of a few bytes. The method of the present invention is fully compatible with the usual control message formats and can thus be used with conventional multimedia units without substantial modifications;
b) The size of a control message is not impacted much, which means that the signaling of content profiles or separate usage rules does not use an important bandwidth;
c) The size of the part of the control message carrying content profiles identifiers or separate usage rules identifiers is fixed. Thus, there is no need to introduce the length of the message for the signaling of content profiles identifiers or separate usage rules identifiers. In particular, the size of the control message does not depend on the complexity of the usage rule or of the number of content protection technologies addressed by the system. Very complex rules can therefore be used without using much bandwidth.

In summary, all content profiles or separate usage rules are sent to every multimedia unit whereas only the content profile identifier, or the usage rule identifiers in one variant, is sent within the entitlement control message with the content to which the usage rule applies. Download of usage rules on the user's multimedia unit not only allows sparing bandwidth within the control message, but also fixing the control message format regardless of the usage rules to be signaled. Hence, the usage rule semantics and fields may change at any moment without impacting broadcast.

As can be seen from FIG. 3, each multimedia unit $STB_1$, $STB_2$ receive the same content and the same content profiles or usage rules. Thus, in each multimedia unit, the content will be associated to the same content profile.

Second Embodiment

According to a second embodiment of the method of the invention, explained in details with reference to FIG. 4, content profiles ($CP_1$, $CP_2$, ..., $CP_i$) are defined as previously and are sent to all the multimedia units STB connected to the management center. These messages can be sent in global entitlement management messages EMM-G. At this stage, all the multimedia units have the same content profiles stored in their memory, like in the first embodiment.

In the management center CG, several user profiles ($UP_1$, $UP_2$, ... ) are defined. According to this second embodiment, each multimedia unit is associated to one user profile ($UP_1$, $UP_2$) in the management center. Such user profiles can for example be bought by a user.

The correct user profile is sent individually to each corresponding target multimedia unit. A user profile can be sent in a conventional entitlement management message EMM or in an equivalent type of message which is addressed uniquely to the concerned multimedia unit. It is also possible to send the user profiles by groups of multimedia units having the same user profile.

Once received by the multimedia unit, the user profile ($UP_1$, $UP_2$) is stored in this unit. The content profiles as well as the user profiles are sent out of band, i.e. independently from the content.

According to this second embodiment, when a content $C_0$ is broadcast, it is sent together with a control message ECM. As previously, this control message can contain a control word and access conditions. It furthermore contains one or several content profile identifiers CP_ID, each of them being linked to a user profile identifier UP_ID, also sent in the same control message. This means that content profile identifiers and user profile identifiers are grouped by pair.

When a multimedia unit receives a content $C_0$ together with the corresponding control message, the user profile for this particular multimedia unit is retrieved from the memory. The control message is then processed in order to extract the pair (user profile identifier, content profile identifier) wherein the user profile identifier corresponds to the user profile stored in the memory of the multimedia unit. This enables obtaining a specific content profile for the specific content and the specific multimedia unit STB.

As in the previous embodiment, the content profile for this specific content can be found thank to the extracted content profile identifier and the content is stored with this content profile.

An example is given in FIG. 4. In this example, multimedia unit $STB_1$ and $STB_3$ have the user profile $UP_1$, whereas $STB_2$ and $STB_4$ have the user profile $UP_2$.

The management center can signal with the broadcast event the following pairs ({$UP\_ID_1$–$CP\_ID_1$}, {$UP\_ID_2$–$CP\_ID_1$}, {$UP\_ID_3$–$CP\_ID_2$}, {$UP\_ID_4$–$CP\_ID_2$}).

When a multimedia unit receives a control message, it extracts the pair UP_ID–CP_ID. It then determines which user profile is memorized in its memory. For multimedia unit $STB_1$, this user profile is $UP_1$. For $STB_4$, this user profile is $UP_2$. The corresponding content profile identifier is extracted from the control message. $UP\_ID_1$ corresponds to $CP\_ID_i$ and $UP\_ID_4$ corresponds to $CP\_ID_2$ in the example.

Thus, in multimedia unit $STB_1$, the content $C_0$ is stored with the content profile $CP_1$, whereas in $STB_4$, the same content is stored with the content profile $CP_2$.

In this case, the users having the first and second user profiles $UP_1$, $UP_2$ will have content controlled by the usage rules of the first content profile $CP_1$, and the users having the third and fourth user profiles $UP_3$, $UP_4$ will have content controlled by the usage rules of the second content profile $CP_2$. Thus, as it can be understood from the example above, the same control message has a different effect on different multimedia units.

This embodiment is especially useful when the content profiles associated to different user profiles are related to a family. For instance, suppose the content profiles include two content profiles for the family 'premium content':

$CP_{prem1}$: RP=1 day, CP=1, RAD=never, OC=strong, ID=11, $CP_{prem2}$: RP=NA, CP=0, RAD=never, OC=strong, ID=12, and two content profiles for the family 'live events':

$CP_{live1}$: RP=unlim., CP=unlim., RAD='end of event', OC=No, ID=21, $CP_{live2}$: RP=unlim., CP=1, RAD=never, OC=No, ID=22.

The two families "premium content" and "live event" are characteristic of the type of content or events. There are typically events that are live, like football game of which remote access date must be controlled, and events that are premium, like a high value recent movie of which copy must be controlled. Then, an event will be signaled either with a content profile in the family "premium content" or with a content profile in the family "live event".

Now, some users with user profile identifier $UP\_ID_1$ may have paid to have the right to rent premium content and to watch live event remotely as soon as possible. Then, when a premium event is broadcast, the management center will send entitlement control messages ECM in which the user profile identifier $UP\_ID_1$ of the users who paid for it is associated with the more flexible content profile $CP_{prem1}$, and the user profile identifiers of other users are associated with the less flexible content profile $CP_{prem2}$, i.e. ($\{UP\_ID_1-CP_{prem1}\_ID\}$, $\{UP\_ID_2-CP_{prem2}\_ID\}$, $\{UP\_ID_3-CP_{prem2}\_ID\}$). Similarly, the live events can be sent with the following signaling: ($\{UP\_ID_1-CP_{live1}\_ID\}$, $\{UP\_ID_2-CP_{live2}\_ID\}$, $\{UP\_ID_3-CP_{live2}\_ID\}$). As can be seen here, the same content is not associated to the same profile content in all the multimedia units.

Notice that like the previous embodiment, this embodiment can have two variants. One in which usage rules are signaled separately with a content profile identifier and content profiles are composed later when the controlled message is received with the content profile identifier, and one where the usage rules are signaled separately with a usage rule identifier. In the last case, the controlled messages must include association of user profile identifiers with sets of usage rule identifiers in place of the content profile identifier.

Third Embodiment

According to a third embodiment, the concept of family is made explicit and the relationship between user profiles and families are entirely managed at the management center instead of the receiving multimedia units.

All the content profiles are not sent to all the multimedia units, contrary to the first and second embodiments. The content profiles CP are explicitly grouped into families in such a way that one family contains the different possible content profiles for one event type.

As in the second embodiment, each multimedia unit is associated to one user profile $UP_1$, $UP_2$, $UP_3$, $UP_4$ . . . in the management center. Each user profile is associated to one content profile of each family. As an example, user profile $UP_1$ is associated to content profile $CP_{prem1}$ in the "premium event" family $F_{prem}$ and to $CP_{live1}$ in the "live event" family $F_{live}$; user profile $UP_2$ is associated to content profile $CP_{prem2}$ in the "premium event" family and to $CP_{live2}$ in the "live event" family.

The content profiles are sent to the corresponding multimedia unit in individual entitlement management messages EMM-U, so that the multimedia units $STB_1$ of the users with profile $UP_1$ receive only $CP_{prem1}$ and $CP_{live1}$ while the multimedia units $STB_2$ of the users with profile $UP_2$ receive only $CP_{prem2}$ and $CP_{live2}$.

When a content $C_0$ is broadcast with the corresponding control message, the control message contains a content profile family identifier CPF_ID. This family identifier is retrieved from this message in the multimedia unit. It is then used to determine for a given multimedia unit, which content profile applies. In the previous example, if the content profile family identifier CPF_ID corresponds to the 'premium event' family, in the multimedia unit $STB_1$ of user with profile $UP_1$, this family identifier results in associating the content $C_0$ to the content profile on the unit for this family, namely $CP_{prem1}$. In multimedia unit $STB_2$, the same family identifier will result in association of the content with $CP_{prem2}$.

Thus, as can be seen, the same control message will not provide the same result on both multimedia units.

Notice that like the two previous embodiments, this embodiment can have two variants regarding the separate signaling of usage rules.

This third embodiment has the advantage that the size of the control message remains fixed and small like in the first embodiment, while this benefit was absent from the second embodiment where several pairs where signaled for the same content. Moreover, this size does not depend on the complexity of the rule. Thus, even complex rules can be implemented in this embodiment without altering the format of the control messages and without wasting bandwidth.

The method of the invention is described herein with four usage types. It should be clear that the number of types could be changed, either to have more types or to have less.

In the examples used in the different embodiments, a content profile CP contains a value for each of the types. According to a variant of the invention, it is possible to suppress condition values for one or more types in the content profile. Such a partial content profile could contain condition values for "Rental period", "copy" and "Remote access date", without having a value for the type "Output control". In this case, the control message ECM which is sent with a specific content could contain the condition value of the missing type. According to a variant, it is also possible to use a default set of values in case a content profile does not contain a value for every usage type. This set of default value can be sent to all multimedia units connected to the management center in global entitlement management messages.

According to a particular embodiment, the usage rules composing a content profile can be separately sent with the content profile identifier in global entitlement management messages. These usage rules can then be stored in the multimedia unit. The multimedia unit can recompose the content profile by grouping the usage rules having the same content profile identifier. This regrouping can be performed either when all usage rules are received from the multimedia unit or when it receives the content profile identifier in the control message.

The invention claimed is:

1. A method for controlling a use of a conditional access content by a multimedia unit, said conditional access content being sent to a plurality of multimedia units connected to a management center, said method comprising:

receiving management messages containing a plurality of content profiles, at a plurality of multimedia units linked to said management center, a content profile being a set of usage rules for different existing controlled content usage types, each of the content profiles having an associated usage rule for at least two controlled content usage types, a usage rule being an instantiation of a given controlled content usage type, and each controlled content usage type corresponding to a specific aspect of conditional access content management;

storing the content profiles in a memory of the multimedia units;

receiving the conditional access content and a control message containing at least information indicating a content profile that is to be linked to the content;

extracting the information indicating the content profile that is to be linked to the conditional access content;

accessing the content profile corresponding to the information indicating the content profile that is to be linked to the conditional access content, said information containing at least a content profile identifier; and using the conditional access content by the multimedia unit according to the usage rules contained in the content profile that is to be linked to the content.

2. The method according to claim 1, wherein the information indicating the content profile that is to be linked to the conditional access content comprises a set of at least two pairs of content profile identifiers/user profile identifiers and wherein said method further comprises the steps of:

associating in the management center, each multimedia unit with a user profile;

sending to each multimedia unit, the corresponding user profile;

wherein the step of extracting the information indicating the content profile comprises determining the pair of content profile identifier/user profile identifier such that the user profile identifier corresponds to the user profile of the multimedia unit;

and wherein the step of accessing the content profile corresponding to the information indicating the content profile uses the content profile identifier of said pair of content profile identifier/user profile identifier.

3. The method according to claim 2, wherein the user profiles are sent in unique or shared entitlement management messages.

4. The method according to claim 1, wherein the use of the conditional access content linked to the content profile comprises storing the conditional access content associated with the content profile in a memory of the multimedia unit.

5. The method according to claim 1, wherein the use of the conditional access content linked to the content profile comprises accessing said content.

6. The method according to claim 1, wherein said content profiles are sent to all the multimedia units connected to the management center.

7. The method according to claim 1, wherein the content profiles are sent in global entitlement management messages.

8. The method according to claim 1, wherein the usage rules composing a content profile are separately sent with the content profile identifier in global entitlement management messages.

9. The method according to claim 8, wherein the multimedia unit recomposes the content profile by grouping the usage rules having the same content profile identifier.

10. The method according to claim 9, wherein the multimedia unit stores the recomposed content profile.

11. The method according to claim 8, wherein the multimedia unit stores the usage rules sent in the global entitlement management messages.

12. The method according to claim 11, wherein the multimedia unit recomposes the content profile when receiving the content profile identifier in the control message.

13. The method according to claim 1, wherein at least one condition value for at least one controlled content usage type is absent from the usage rules.

14. The method according to claim 13, wherein the missing condition value for at least one controlled content usage type is transmitted in the control message.

15. The method according to claim 13, wherein multimedia units set the missing condition values for at least one controlled content usage type using a default set of values.

16. The method according to claim 15, wherein the said default set of values is sent to all multimedia units connected to the management center in global entitlement management messages.

17. A multimedia unit comprising means for implementing the method of claim 1.

18. A method for controlling the use of a conditional access content by a multimedia unit, said conditional access content being sent to a plurality of multimedia units connected to a management center, said method comprising:

receiving a plurality of content profile families at each of the multimedia units, each of the content profile families including a plurality of content profiles, a content profile being a set of usage rules for different existing controlled content usage types, each content profile having an associated usage rule for at least two controlled content usage types, a usage rule being an instantiation of a given controlled content usage type, and each controlled content usage type corresponding to a specific aspect of conditional access content management, each of the multimedia units being associated with a user profile, each user profile being associated with a content profile of a content profile family;

storing the content profiles of each content profile family in a memory of the multimedia units;

receiving the conditional access content and a control message containing at least information indicating a content profile family associated with the conditional access content, said information containing at least a content profile family identifier;

extracting the information indicating the content profile family associated with the conditional access content;

accessing, in the multimedia unit, the content profile family corresponding to the information indicating the content profile family associated with the conditional access content;

accessing, in the multimedia unit, a content profile to be linked to the conditional access content from among the content profiles of the content profile family accessed in the previous step;

using the conditional access content by the multimedia unit according to the usage rules contained in the content profile that is to be linked to the conditional access content.

19. The method according to claim 18, wherein the use of the conditional access content linked to the content profile families comprises storing the conditional access content associated with the content profile in a memory of the multimedia unit.

20. The method according to claim 18, wherein the use of the conditional access content linked to the content profile families comprises accessing said conditional access content.

21. The method according to claim 18, wherein the content profiles of each family are sent in unique or shared entitlement management messages.

22. A multimedia unit comprising means for implementing the method of claim 18.

* * * * *